(12) United States Patent
Kim

(10) Patent No.: US 9,908,516 B2
(45) Date of Patent: Mar. 6, 2018

(54) BRAKE CONTROL APPARATUS OF VEHICLE AND BRAKE CONTROL METHOD THEREOF

(71) Applicant: MANDO CORPORATION, Gyeonggi-do (KR)

(72) Inventor: Jin-Myung Kim, Gyeonggi-do (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 128 days.

(21) Appl. No.: 14/929,570

(22) Filed: Nov. 2, 2015

(65) Prior Publication Data
US 2016/0121863 A1     May 5, 2016

(30) Foreign Application Priority Data

Nov. 4, 2014  (KR) .......................... 10-2014-0151902

(51) Int. Cl.
*B60T 7/22* (2006.01)
*B60T 7/04* (2006.01)

(52) U.S. Cl.
CPC ................ *B60T 7/22* (2013.01); *B60T 7/042* (2013.01); *B60T 2201/022* (2013.01)

(58) Field of Classification Search
CPC .................................... B60T 7/22; B60T 7/042
See application file for complete search history.

(56) References Cited

U.S. PATENT DOCUMENTS

2011/0190998 A1\* 8/2011 Kato .................... B60T 7/22
                                                           701/70

FOREIGN PATENT DOCUMENTS

JP     H06305403 A    11/1994
JP     H08310359 A    11/1996
(Continued)

OTHER PUBLICATIONS

Notice of Patent Allowance dated Feb. 29, 2016, in related Korean Patent Application No. 10-2014-0151902 (English Translation provided).
(Continued)

*Primary Examiner* — Basil T. Jos
(74) *Attorney, Agent, or Firm* — McDermott Will & Emery LLP

(57) ABSTRACT

Disclosed herein is a vehicle brake control apparatus, and a brake control method thereof. The vehicle brake control apparatus includes a detector configured to detect automatic brake control pressure information when an automatic brake apparatus performs an automatic braking by using the automatic brake control pressure information as closing to a current object, and releases the automatic braking; a determination unit configured to determine whether it is a first state in which a present time of detected automatic brake control pressure information is an automatic brake release time; a braking force maintenance unit configured to maintain the automatic brake release time of the automatic brake control pressure information, when it is determined to be the first state, until driver brake control pressure information of a pedal, which is stepped by a driver, becomes the same state as the automatic brake control information; and a controller configured to deliver a command of maintaining braking force to the braking force maintenance unit so as to receive the automatic brake control pressure information and the driver brake control pressure information, and so as to maintain the automatic brake release time of the automatic brake control pressure information until the driver brake control pressure information becomes the same state as the automatic brake control pressure information.

18 Claims, 14 Drawing Sheets

(56) References Cited

FOREIGN PATENT DOCUMENTS

| JP | H111164 A | 1/1999 |
| JP | 2005001460 A | 1/2005 |

OTHER PUBLICATIONS

Chinese Office Action dated Nov. 1, 2017 issued in Chinese Patent Application No. 201510741386.6.

* cited by examiner

BRAKE CONTROL APPARATUS OF VEHICLE AND BRAKE CONTROL METHOD THEREOF

CROSS-REFERENCE TO RELATED APPLICATION(S)

This application claims the benefit of Korean Patent Application No. 10-2014-0151902, filed on Nov. 4, 2014 in the Korean Intellectual Property Office, the disclosure of which is incorporated herein by reference.

BACKGROUND

1. Field

Embodiments of the present disclosure relate to a vehicle brake control apparatus, and a brake control method thereof.

2. Description of Related Art

In general, a conventional brake apparatus of vehicle is provided to put a brake on a vehicle.

For example, the conventional vehicle brake apparatus of a vehicle may be provided as an automatic brake apparatus, i.e. an adaptive cruise control apparatus, e.g. Adaptive Cruise Control (ACC) or Smart Cruise Control (SCC), to put a brake on a vehicle automatically.

The automatic brake apparatus performs a brake in a way of performing an automatic braking through automatic brake control pressure information as closing to a current object, releasing the automatic braking, and supplying driver brake control pressure information of brake pedal, which is stepped a the driver, from when an automatic brake release time.

However, since the conventional automatic brake apparatus supplies driver brake control pressure information of brake pedal, which is stepped by the driver, while the automatic brake control pressure is decreased from when the automatic brake release time, there may be a limitation to reducing a braking force loss and to supplying stable braking sense to the driver.

Therefore, in recent, the research in an advanced brake control apparatus of a vehicle, which is configured to reduce a loss of braking force, to provide a stable brake sense to a driver, to prevent a risk of collision in advance, and to lead a driver to drive carefully, and a brake control method thereof has been in progress.

SUMMARY

Therefore, it is an aspect of the present disclosure to provide a vehicle brake control apparatus capable of reducing a loss of braking force, providing a stable braking sense to a driver, and preventing a risk of collision in advance, and a brake control method thereof.

It is another aspect of the present disclosure to provide a vehicle brake control apparatus capable of leading a driver to drive carefully and a brake control method thereof.

Additional aspects of the present disclosure will be set forth in part in the description which follows and, in part, will be obvious from the description, or may be learned by practice of the present disclosure.

In accordance with one aspect of the present disclosure, a vehicle brake control apparatus includes a detector configured to detect automatic brake control pressure information when an automatic brake apparatus performs an automatic braking by using the automatic brake control pressure information as closing to a current object, and releases the automatic braking; a determination unit configured to determine whether it is a first state in which a present time of detected automatic brake control pressure information is an automatic brake release time; a braking force maintenance unit configured to maintain the automatic brake release time of the automatic brake control pressure information, when it is determined to be the first state, until driver brake control pressure information of a pedal, which is stepped by a driver, becomes the same state as the automatic brake control information; and a controller configured to deliver a command of maintaining braking force to the braking force maintenance unit so as to receive the automatic brake control pressure information and the driver brake control pressure information, and so as to maintain the automatic brake release time of the automatic brake control pressure information until the driver brake control pressure information becomes the same state as the automatic brake control pressure information.

The determination unit may further determine whether the driver brake control pressure information is the same state as the automatic brake control pressure information, and the controller may further release the automatic brake control pressure of the automatic brake control pressure information when the determination unit determines that the driver brake control pressure information is the same state as the automatic brake control pressure information.

The braking force maintenance unit may maintain the automatic brake control pressure information as a certain automatic brake control pressure pulse pattern during the automatic brake release time period of the automatic brake control pressure information until the driver brake control pressure information becomes the same state as the automatic brake control pressure information.

The braking force maintenance unit may maintain the automatic brake control pressure information as an automatic brake control pressure pulse pattern having a certain angle during the automatic brake release time period of the automatic brake control pressure information until the driver brake control pressure information becomes the same state as the automatic brake control pressure information.

The braking force maintenance unit may maintain the automatic brake control pressure information as an automatic brake control pressure pulse pattern having a certain bent surface during the automatic brake release time period of the automatic brake control pressure information until the driver brake control pressure information becomes the same state as the automatic brake control pressure information.

The braking force maintenance unit may maintain the automatic brake control pressure information as an automatic brake control pressure pulse pattern having a certain curved surface during the automatic brake release time period of the automatic brake control pressure information until the driver brake control pressure information becomes the same state as the automatic brake control pressure information.

The vehicle brake control apparatus may further include a first identification unit configured to identify whether the automatic brake control pressure information is maintained during the automatic brake release time period until the driver brake control pressure information becomes the same state as the automatic brake control pressure information.

The vehicle brake control apparatus may further include a second identification unit configured to identify whether the automatic brake control pressure of the automatic brake control pressure information is released, when the driver brake control pressure information is determined to be the same state as the automatic brake control pressure information.

The current object may include at least one of an outside wall, another vehicle and a motorcycle, and animal and obstacle.

In accordance with another aspect of the present disclosure, a brake control method of a vehicle brake control apparatus includes a detection operation of detecting automatic brake control pressure information when an automatic brake apparatus performs an automatic braking by using the automatic brake control pressure information as closing to a current object, and releases the automatic braking; a first determination operation of determining whether it is a first state in which a present time of detected automatic brake control pressure information is an automatic brake release time; and a braking force maintenance operation of maintaining the automatic brake release time of the automatic brake control pressure information, when it is the first state, until driver brake control pressure information of a pedal, which is stepped by a driver, becomes the same state as the automatic brake control information.

The brake control method may further include a second determination operation of determining whether the driver brake control pressure information is the same state as the automatic brake control pressure information, and an automatic brake control pressure release operation of more releasing the automatic brake control pressure of the automatic brake control pressure information when the driver brake control pressure information is the same state as the automatic brake control pressure information.

The braking force maintenance operation may maintain the automatic brake control pressure information as a certain automatic brake control pressure pulse pattern during the automatic brake release time period of the automatic brake control pressure information until the driver brake control pressure information becomes the same state as the automatic brake control pressure information.

The braking force maintenance operation may maintain the automatic brake control pressure information as an automatic brake control pressure pulse pattern having a certain angle during the automatic brake release time period of the automatic brake control pressure information until the driver brake control pressure information becomes the same state as the automatic brake control pressure information.

The braking force maintenance operation may maintain the automatic brake control pressure information as an automatic brake control pressure pulse pattern having a certain bent surface during the automatic brake release time period of the automatic brake control pressure information until the driver brake control pressure information becomes the same state as the automatic brake control pressure information.

The braking force maintenance operation may maintain the automatic brake control pressure information as an automatic brake control pressure pulse pattern having a certain curved surface during the automatic brake release time period of the automatic brake control pressure information until the driver brake control pressure information becomes the same state as the automatic brake control pressure information.

The brake control method may further include a first identification operation of identifying whether the automatic brake control pressure information is maintained during the automatic brake release time period until the driver brake control pressure information becomes the same state as the automatic brake control pressure information.

The brake control method may further include a second identification operation of identifying whether the automatic brake control pressure of the automatic brake control pressure information is released when the driver brake control pressure information becomes the same state as the automatic brake control pressure information.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings.

Figure 1:
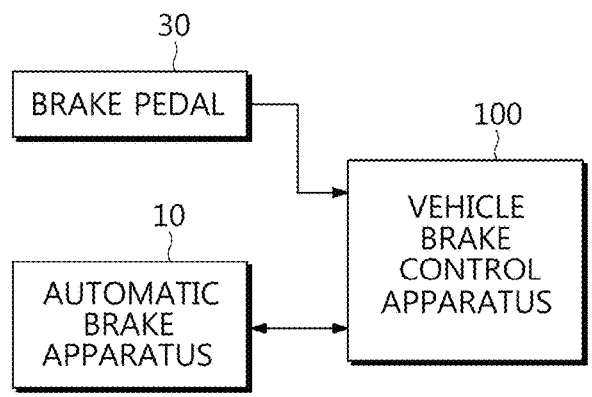
FIG. 1 is a block diagram illustrating a state in which a vehicle brake control apparatus is connected to a brake pedal and an automatic brake apparatus in accordance with a first embodiment of the present disclosure.
Figure 2:
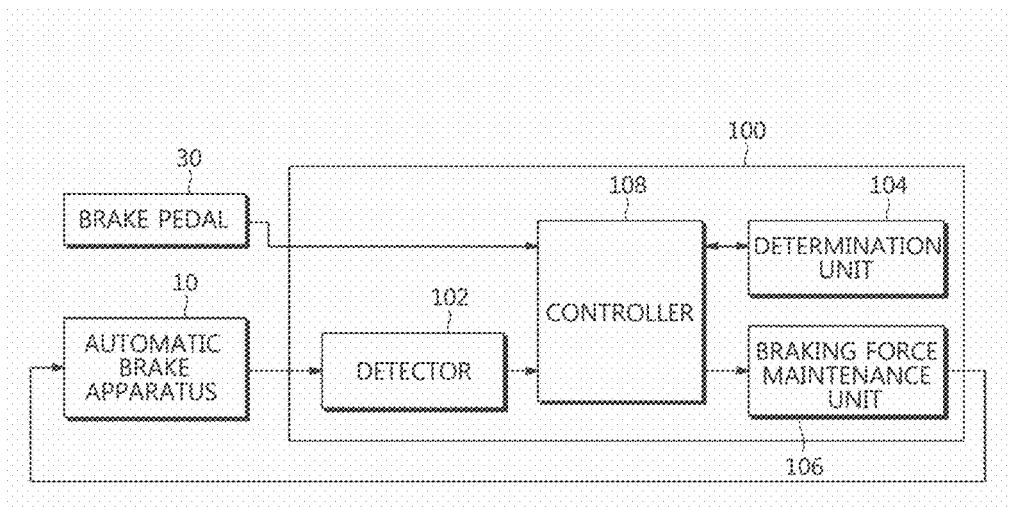
FIG. 2 is a block diagram illustrating an example of the vehicle brake control apparatus illustrated in FIG. 1.

FIG. 1 is a block diagram illustrating a state in which a vehicle brake control apparatus is connected to a brake pedal and an automatic brake apparatus in accordance with a first embodiment of the present disclosure and FIG. 2 is a block diagram illustrating an example of the vehicle brake control apparatus illustrated in FIG. 1.

Figure 3:
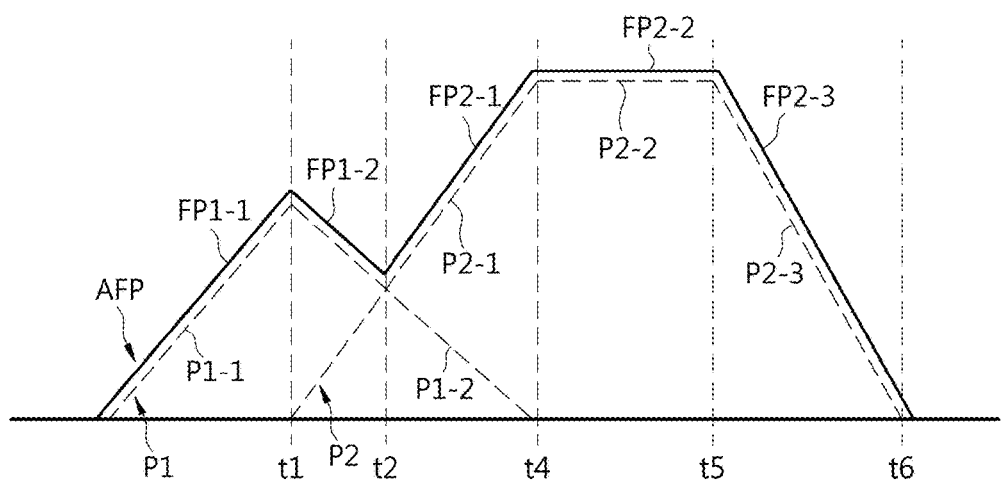
FIG. 3 is a graph illustrating conventional automatic brake control pressure information, driver brake control pressure information, and final brake control pressure information.
Figure 4:
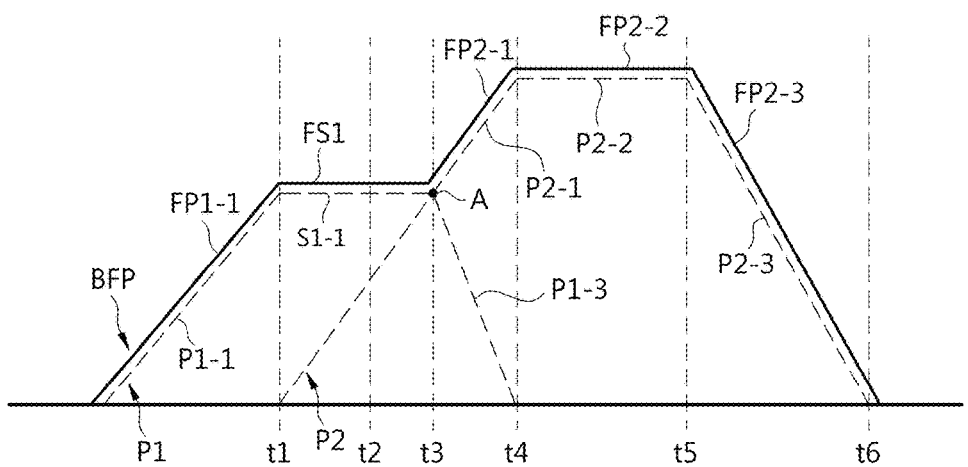
FIG. 4 is a graph illustrating an example of automatic brake control pressure information, automatic brake control pressure pulse pattern, driver brake control pressure information, and final brake control pressure information in accordance with the present disclosure.

FIG. 3 is a graph illustrating conventional automatic brake control pressure information, driver brake control pressure information, and final brake control pressure information and FIG. 4 is a graph illustrating an example of automatic brake control pressure information, automatic brake control pressure pulse pattern, driver brake control pressure information, and final brake control pressure information in accordance with the present disclosure.

Figure 5:
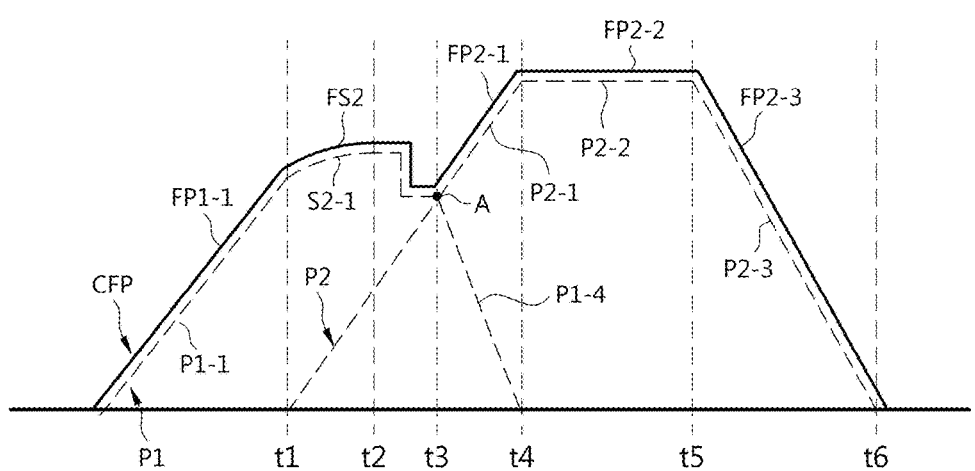
FIG. 5 is a graph illustrating another example of automatic brake control pressure information, automatic brake control pressure pulse pattern, driver brake control pressure information, and final brake control information in accordance with the present disclosure.
Figure 6:
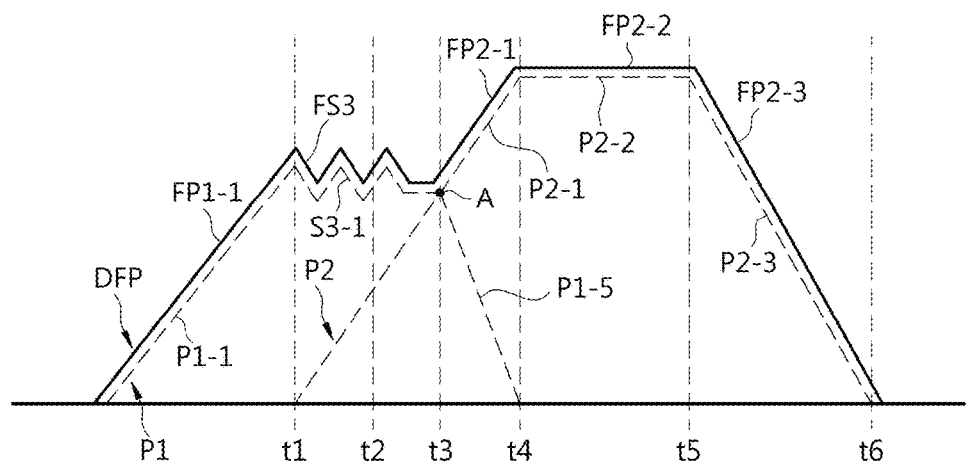
FIG. 6 is a graph illustrating another example of automatic brake control pressure information, automatic brake control pressure pulse pattern, driver brake control pressure information, and final brake control pressure information in accordance with the present disclosure.

FIG. 5 is a graph illustrating another example of automatic brake control pressure information, automatic brake control pressure pulse pattern, driver brake control pressure information, and final brake control pressure information in accordance with the present disclosure and FIG. 6 is a graph illustrating another example of automatic brake control pressure information, automatic brake control pressure pulse pattern, driver brake control pressure information, and final brake control pressure information in accordance with the present disclosure.

Figure 7:
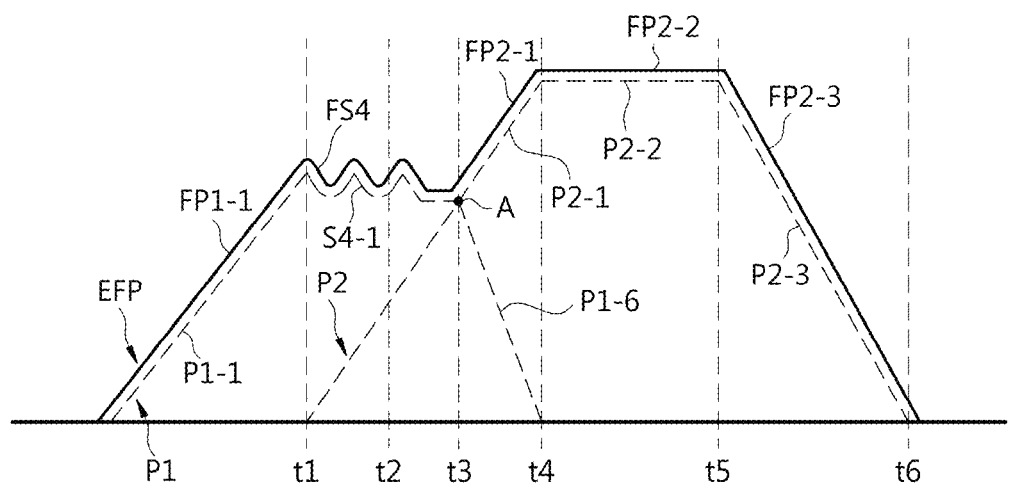
FIG. 7 is a graph illustrating another example of automatic brake control pressure information, automatic brake control pressure pulse pattern, driver brake control pressure information, and final brake control pressure information in accordance with the present disclosure.
Figure 8:
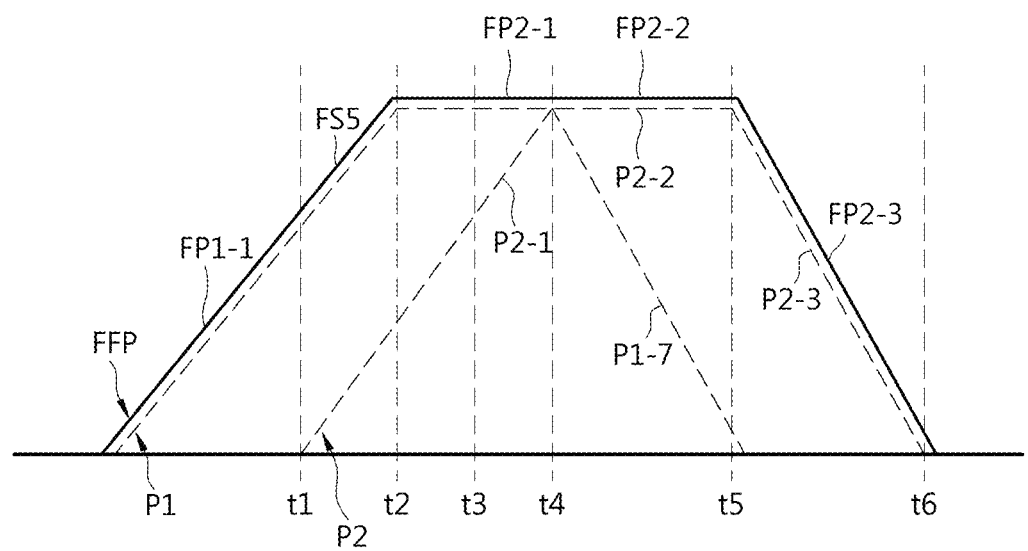
FIG. 8 is a graph illustrating another example of automatic brake control pressure information, automatic brake control pressure pulse pattern, driver brake control pressure information, and final brake control pressure information in accordance with the present disclosure.

FIG. 7 is a graph illustrating another example of automatic brake control pressure information, automatic brake control pressure pulse pattern, driver brake control pressure information, and final brake control pressure information in accordance with the present disclosure and FIG. 8 is a graph illustrating another example of automatic brake control pressure information, automatic brake control pressure pulse pattern, driver brake control pressure information, and final brake control pressure information in accordance with the present disclosure.

Referring to FIGS. 1 to 8, according to a first embodiment of the present disclosure, a vehicle brake control apparatus 100 may include a detector 102, a determination unit 104, a braking force maintenance unit 106, and a controller 108.

As illustrated in FIGS. 2, and 4 to 8, the detector 102 may detect automatic brake control pressure information (P1) when an automatic braking (P1-1) is performed by using automatic brake control pressure information (P1) in an automatic brake apparatus 10 as closing to a current object, and then the automatic braking is released (P1-3, P1-4, P1-5, P1-6).

The detector 102 may include a pressure detection sensor (not shown) configured to detect automatic brake control pressure information (P1).

The automatic brake apparatus 10 may be an adaptive cruise control apparatus, e.g. Adaptive Cruise Control (ACC) or Smart Cruise Control (SCC).

The current object may be at least one of an outside wall, another vehicle and motorcycle, and animal and obstacle.

The determination unit 104 may determine whether it is a first state in which a present time of automatic brake control pressure information (P1) detected by the detector 102 is an automatic brake release time (t1), or not.

When it is the first state in which the present time of automatic brake control pressure information (P1) detected by the detector 102 is an automatic brake release time (t1), the braking force maintenance unit 106 may maintain an automatic brake release time period (t1 to t3) of the automatic brake control pressure information (P1) until driver brake control pressure information (P2) of a brake pedal 30, which is stepped by the driver, becomes the same state (A) as the automatic brake control pressure information (P1).

The controller 108 may receive the automatic brake control pressure information (P1) and the driver brake control pressure information (P2) and may deliver a command of maintaining braking force to the braking force maintenance unit 106 so as to maintain the automatic brake release time period (t1 to t3) of the automatic brake control pressure information (P1) until the driver brake control pressure information (P2) of a brake pedal 30, which is stepped by the driver, becomes the same state (A) as the automatic brake control pressure information (P1).

For an example, as illustrated in FIG. 4, the braking force maintenance unit 106 may maintain the automatic brake control pressure information (P1) as a certain automatic brake control pressure pulse pattern (S1-1) during the automatic brake release time period (t1 to t3) of the automatic brake control pressure information (P1), until the driver brake control pressure information (P2) of the brake pedal 30, which is stepped by the driver, becomes the same state (A) as the automatic brake control pressure information (P1).

For another example, as illustrated in FIG. 5, the braking force maintenance unit 106 may maintain the automatic brake control pressure information (P1) as an automatic brake control pressure pulse pattern (S2-1) having a certain angle during the automatic brake release time period (t1 to t3) of the automatic brake control pressure information (P1) until the driver brake control pressure information (P2) of the brake pedal 30, which is stepped by the driver, becomes the same state (A) as the automatic brake control pressure information (P1).

For another example, as illustrated in FIG. 6, the braking force maintenance unit 106 may maintain the automatic brake control pressure information (P1) as an automatic brake control pressure pulse pattern (S3-1) having a certain bent surface during the automatic brake release time period (t1 to t3) of the automatic brake control pressure information (P1) until the driver brake control pressure information (P2) of the brake pedal 30, which is stepped by the driver, becomes the same state (A) as the automatic brake control pressure information (P1).

For another example, as illustrated in FIG. 7, the braking force maintenance unit 106 may maintain the automatic brake control pressure information (P1) as an automatic brake control pressure pulse pattern (S4-1) having a certain curved surface during the automatic brake release time period (t1 to t3) of the automatic brake control pressure information (P1) until the driver brake control pressure information (P2) of the brake pedal 30, which is stepped by the driver, becomes the same state (A) as the automatic brake control pressure information (P1).

For another example, as illustrated in FIG. 8, when it is the first state in which the present time of automatic brake control pressure information (P1) is the automatic brake release time (t1), the braking force maintenance unit 106 may maintain a state in which a braking force is continuously increased, by adding the driver brake control pressure information (P2) of the brake pedal 30, which is stepped by the driver, to the automatic brake control pressure information (P1).

The determination unit 104 may further determine whether the driver brake control pressure information (P2) of the brake pedal 30, which is stepped by the driver, is the same state (A) as the automatic brake control pressure information (P1).

As illustrated in FIG. 8, the determination unit 104 may determine whether an automatic brake control maximum value is reached, when the braking force maintenance unit 106 maintains the state in which a braking force is continuously increased.

When the determination unit 104 determines that the driver brake control pressure information (P2) of the brake pedal 30, which is stepped by the driver, is the same state (A) as the automatic brake control pressure information (P1), the controller 108 may more release an automatic brake control pressure of the automatic brake control pressure information (P1), which is (P1-3, P1-4, P1-5, P1-6).

That is, as illustrated in FIG. 3, the automatic brake control pressure information (P1) of the conventional automatic brake apparatus may perform the automatic braking (P1-1) during the automatic brake time period (t1) as closing to a current object and then may release the automatic braking (P1-2) during an automatic brake release time period (t1, t2, t4).

At this time, the driver brake control pressure information (P2) may be generated from the automatic brake release time (t1), may perform a driver brake control (P2-1) during the automatic brake release time period (t1, t2, t4), may maintain a driver brake control during a driver brake control maintenance time (t4, t5), and then may release the driver brake control (P2-3) during a driver brake control release time period (t5, t6).

Final brake control pressure information (AFP) formed by the automatic brake control pressure information (P1) of the conventional automatic brake apparatus and the driver brake control pressure information (P2) may perform automatic braking (FP1-1) during the automatic brake time period (t1).

The final brake control pressure information (AFP) may release the automatic braking (FP1-2) during the automatic brake release time period (t1, t2) while performing a driver brake control (FP2-1) during the automatic brake release time period (t2, t4).

The final brake control pressure information (AFP) may maintain the driver brake control (FP2-2) during the driver brake control maintenance time period (t4, t5) and then may release the driver brake control (FP2-3) during the driver brake control release time period (t5, t6).

In contrast, as illustrated in FIGS. 2 and 4 to 7, the automatic brake control pressure information (P1) of the automatic brake apparatus 10 may perform the automatic braking (P1-1) during the automatic brake time period (t1) as closing to a current object.

The braking force maintenance unit 106 may maintain an automatic brake control pulse pattern (S1-1, S2-1, S3-1, S4-1) of the automatic brake control pressure information (P1) during the automatic brake release time period (t1 to t3) in the automatic brake release time period (t1 to t4), until the driver brake control pressure information (P2) of the brake pedal 30, which is stepped by the driver, becomes the same state (A) as the automatic brake control pressure information (P1).

The driver brake control pressure information (P2) may be generated from the automatic brake release time (t1), may perform the driver brake control (P2-1) during the automatic brake release time period (t1 to t4).

The determination unit 104 may determine whether the driver brake control pressure information (P2) of the brake pedal 30, which is stepped by the driver, is the same state (A) as the automatic brake control pressure information (P1).

When the determination unit 104 determines that the driver brake control pressure information (P2) of the brake pedal 30, which is stepped by the driver, is the same state (A) as the automatic brake control pressure information (P1), the controller 108 may more release the automatic brake control pressure of the automatic brake control pressure information (P1) during the automatic brake release time period (t3, t4), which is (P1-3, P1-4, P1-5, P1-6).

The driver brake control pressure information (P2) may maintain the driver brake control (P2-2) during the driver brake control maintenance time period (t4, t5) and may release a driver brake control (P2-3) during the driver brake control release time (t5, t6).

Final brake control pressure information (BFP, CFP, DFP, EFP), which is formed by the automatic brake control pressure information (P1) of the automatic brake apparatus 10, the automatic brake control pressure pulse pattern (S1-1, S2-1, S3-1, S4-1) of the braking force maintenance unit 106, and the driver brake control pressure information (P2), may perform the automatic braking (FP1-1) during the automatic brake time period (t1).

The final brake control pressure information (BFP, CFP, DFP, EFP) may maintain the automatic brake control pressure pulse pattern (S1-1, S2-1, S3-1, S4-1) of the automatic brake control pressure information (P1) during the automatic brake release time period (t1 to t3) until the driver brake control pressure information (P2) of the brake pedal 30, which is stepped by the driver, becomes the same state (A) as the automatic brake control pressure information (P1), which is (FS1, FS2, FS3, FS4).

The final brake control pressure information (BFP, CFP, DFP, EFP) may perform the driver brake control (FP2-1) during the automatic brake release time (t3, t4), may maintain the driver brake control (FP2-2) during the driver brake control maintenance time period (t4, t5) and may release the driver brake control (FP2-3) during the driver brake control release time period (t5, t6).

As illustrated in FIG. 8, the automatic brake control pressure information (P1) of the automatic brake apparatus 10 may perform the automatic braking during the automatic brake time period (t1) as closing to a current object.

When it is the first state in which the present time of automatic brake control pressure information (P1) is the automatic brake release time period (t1), the braking force maintenance unit 106 may maintain the state in which a braking force is continuously increased, by adding the driver brake control pressure information (P2) of the brake pedal 30, which is stepped by the driver, to the automatic brake control pressure information (P1).

At this time, the driver brake control pressure information (P2) may be generated from the automatic brake release time (t1), and may perform the driver brake control (P2-1) during the automatic brake release time period (t1 to t4).

As illustrated in FIG. 8, the determination unit 104 may determine whether an automatic brake control maximum value is reached, when the braking force maintenance unit 106 maintains the state in which a braking force is continuously increased.

Herein, the automatic brake control maximum value may represent a pre-determined value in the controller 108.

When the automatic brake control maximum value is determined to be reached since the braking force maintenance unit 106 maintains the state in which a braking force is continuously increased, the controller 108 may maintain the automatic brake control pressure of the automatic brake control pressure information (P1) as the maximum value during a time period (t3, t4) in which the driver brake control pressure information reaches the maximum value.

That is, the driver brake control pressure information (P2) may maintain the driver brake control (P2-2) during the driver brake control maintenance time period (t4, t5) and then may release the driver brake control (P2-3) during the driver brake control release time period (t5, t6).

Final brake control pressure information (FFP) formed by the automatic brake control pressure information (P1) of the automatic brake apparatus 10, the automatic brake control pressure and the driver brake control pressure information (P2) of the braking force maintenance unit 106 may perform automatic braking (FP1-1) during the automatic brake time period (t1).

The final brake control pressure information (FFP) may maintain the driver brake control pressure information (P2) until the automatic brake control maximum value is reached, by adding the driver brake control pressure information (P2) of the brake pedal 30, which is stepped by the driver, to the automatic brake control pressure information (P1), and then may release it when the driver brake control pressure information (P2) reaches the automatic brake control maximum value.

The final brake control pressure information (FFP) may perform the driver brake control (FP2-1) during the automatic brake release time period (t3, t4), may maintain the driver brake control (FP2-2) during the driver brake control maintenance time period (t4, t5) and then may release the driver brake control (FP2-3) during the driver brake control release time period (t5, t6).

The determination unit 104, the braking force maintenance unit 106 and the controller 108 may be implemented by Electric Control Unit (ECU: not shown), which is a main computer applied to a vehicle, configured to control and determine an overall operation, and configured to maintain the automatic brake release time period (t1 to t3) of the automatic brake control pressure information (P1).

The determination unit 104, the braking force maintenance unit 106 and the controller 108 may be implemented by Micro Control Unit (MCU: not shown), which is a main computer applied to a vehicle, configured to control and determine an overall operation, and configured to maintain the automatic brake release time period (t1 to t3) of the automatic brake control pressure information (P1).

The determination unit 104, the braking force maintenance unit 106 and the controller 108 is not limited thereto. The determination unit 104, the braking force maintenance unit 106 and the controller 108 may be implemented by any control means, determining means, and braking force maintenance means, which is configured to control and determine an overall operation, and configured to maintain the automatic brake release time period (t1 to t3) of the automatic brake control pressure information (P1).

The determination unit 104, the braking force maintenance unit 106 and the controller 108 may be implemented by Electric Control Unit (ECU: not shown) and Micro Control Unit (MCU: not shown) in an integrated or separated manner.

A vehicle brake control method for control the brake of the vehicle by using the vehicle brake control apparatus 100 according to the first embodiment will be described in the followings with reference to FIGS. 9 to 14.

Figure 9:
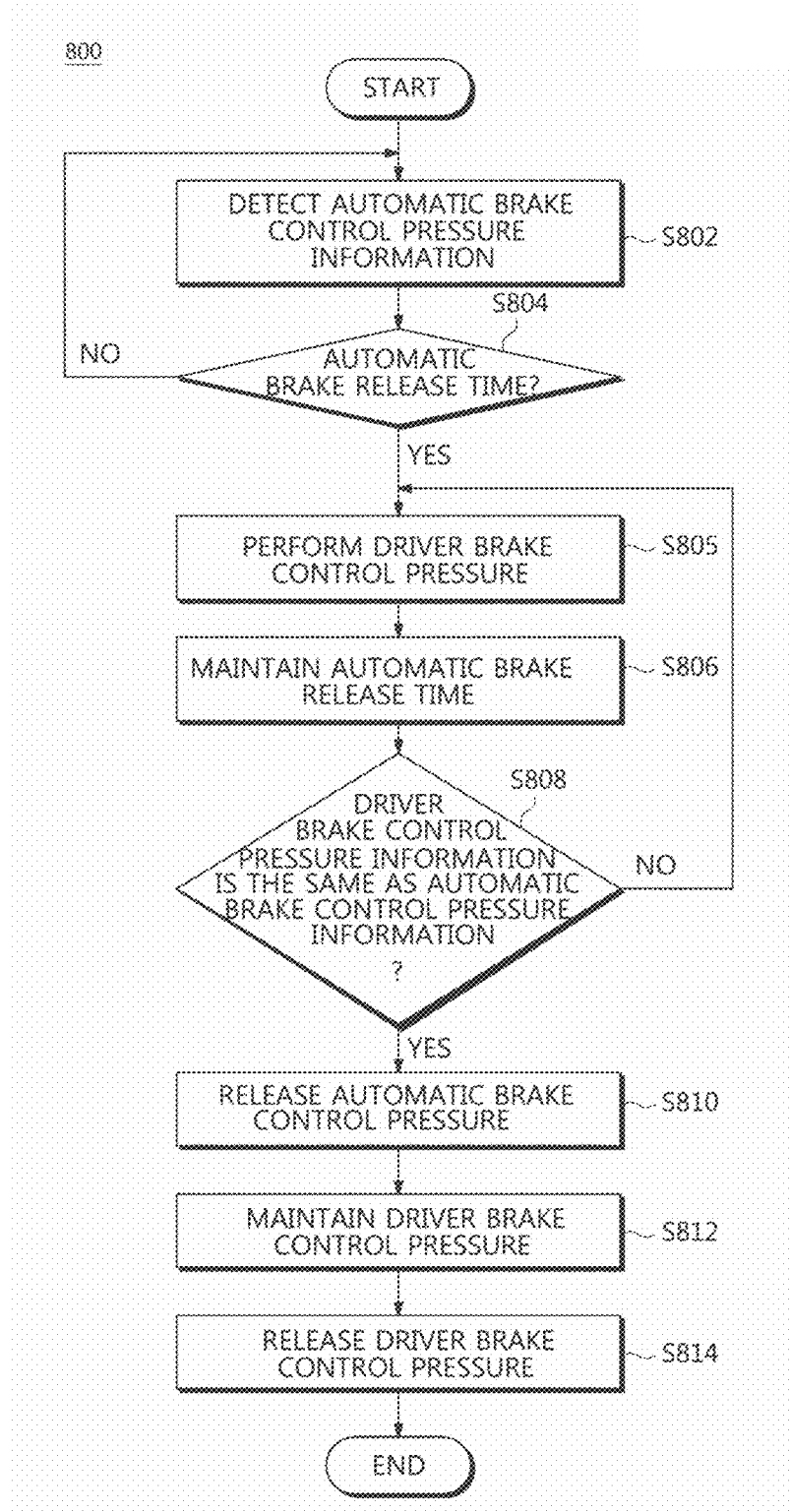
FIG. 9 is a control flowchart illustrating a vehicle brake control method of a vehicle brake control apparatus in accordance with the first embodiment of the present disclosure.
Figure 10:
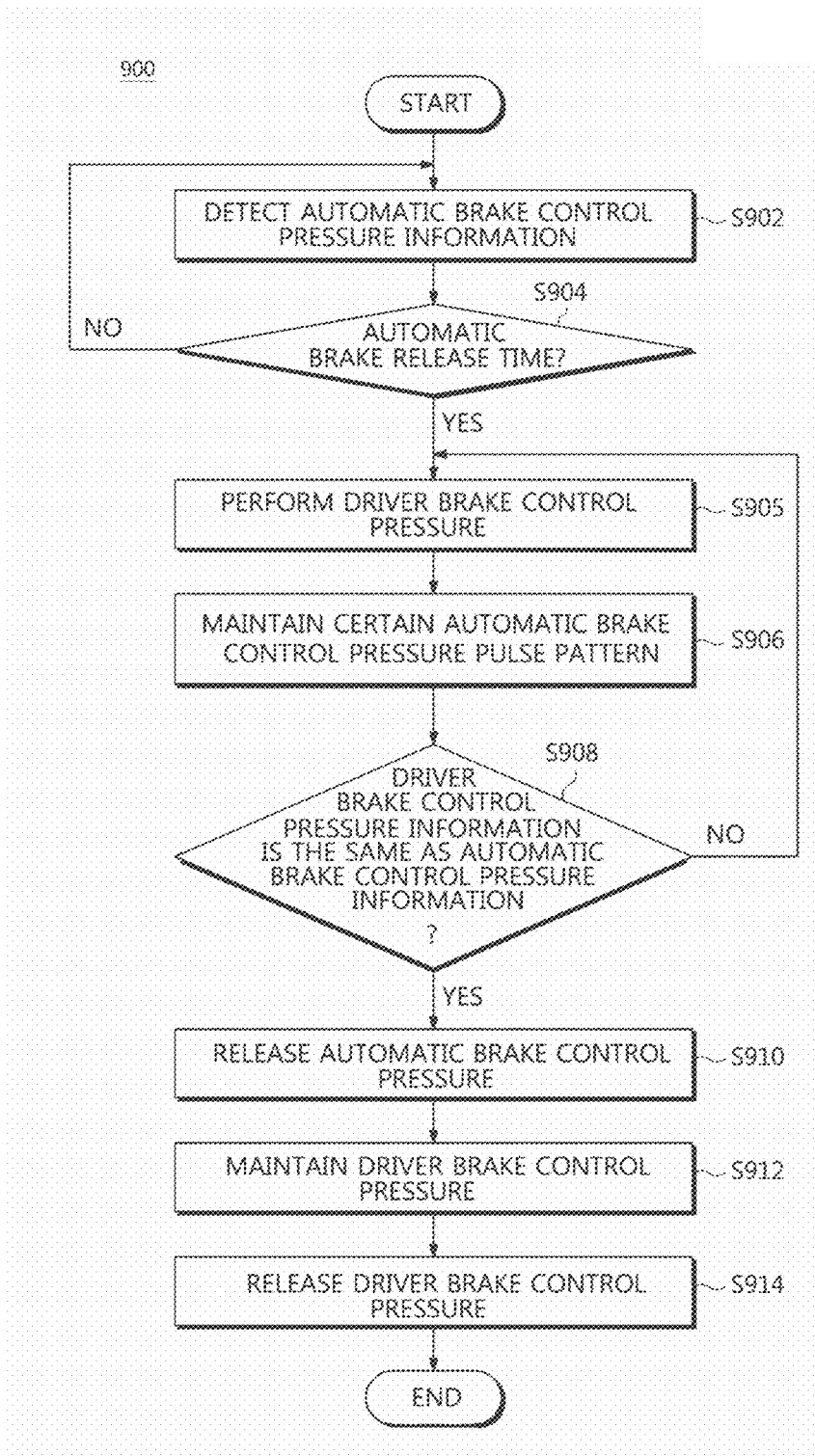
FIG. 10 is a control flowchart illustrating an example of a vehicle brake control method of a vehicle brake control apparatus in accordance with the first embodiment of the present disclosure.

FIG. 9 is a control flowchart illustrating a vehicle brake control method of a vehicle brake control apparatus in accordance with the first embodiment of the present disclosure and FIG. 10 is a control flowchart illustrating an example of a vehicle brake control method of a vehicle brake control apparatus in accordance with the first embodiment of the present disclosure.

Figure 11:
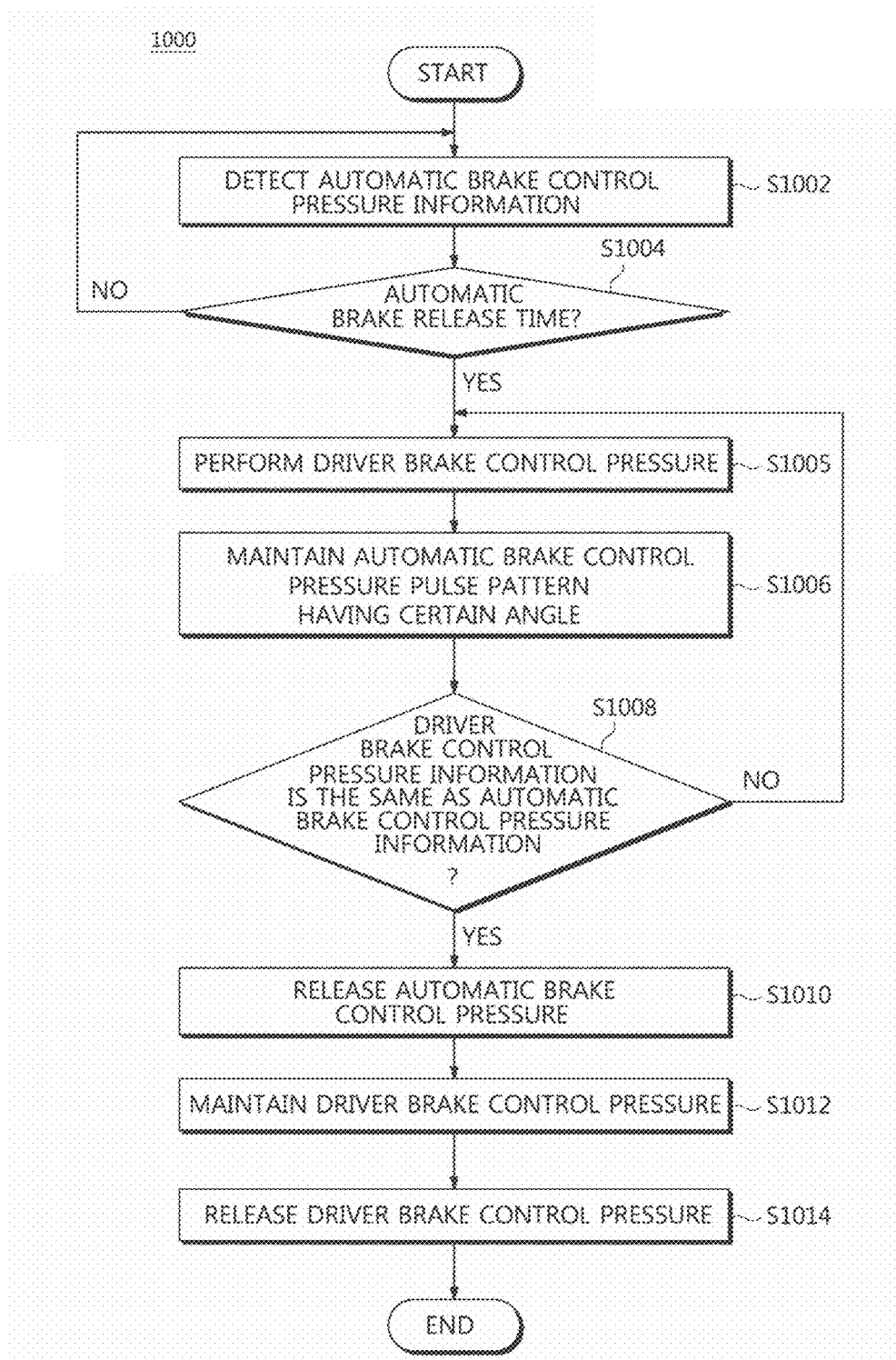
FIG. 11 is a control flowchart illustrating another example of a vehicle brake control method of a vehicle brake control apparatus in accordance with the first embodiment of the present disclosure.
Figure 12:
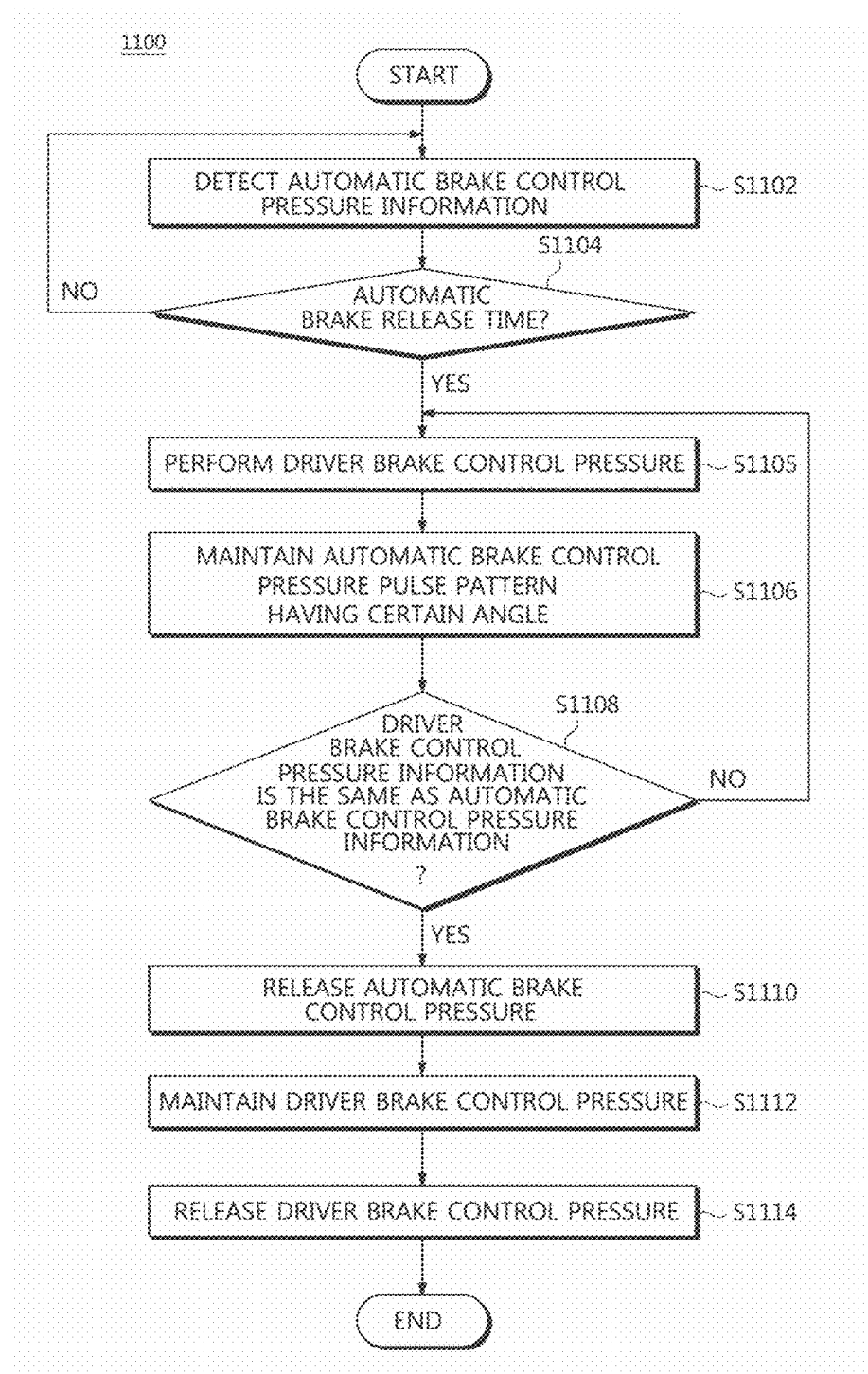
FIG. 12 is a control flowchart illustrating another example of a vehicle brake control method of a vehicle brake control apparatus in accordance with the first embodiment of the present disclosure.

FIG. 11 is a control flowchart illustrating another example of a vehicle brake control method of a vehicle brake control apparatus in accordance with the first embodiment of the present disclosure and FIG. 12 is a control flowchart illustrating another example of a vehicle brake control method of a vehicle brake control apparatus in accordance with the first embodiment of the present disclosure.

Figure 13:
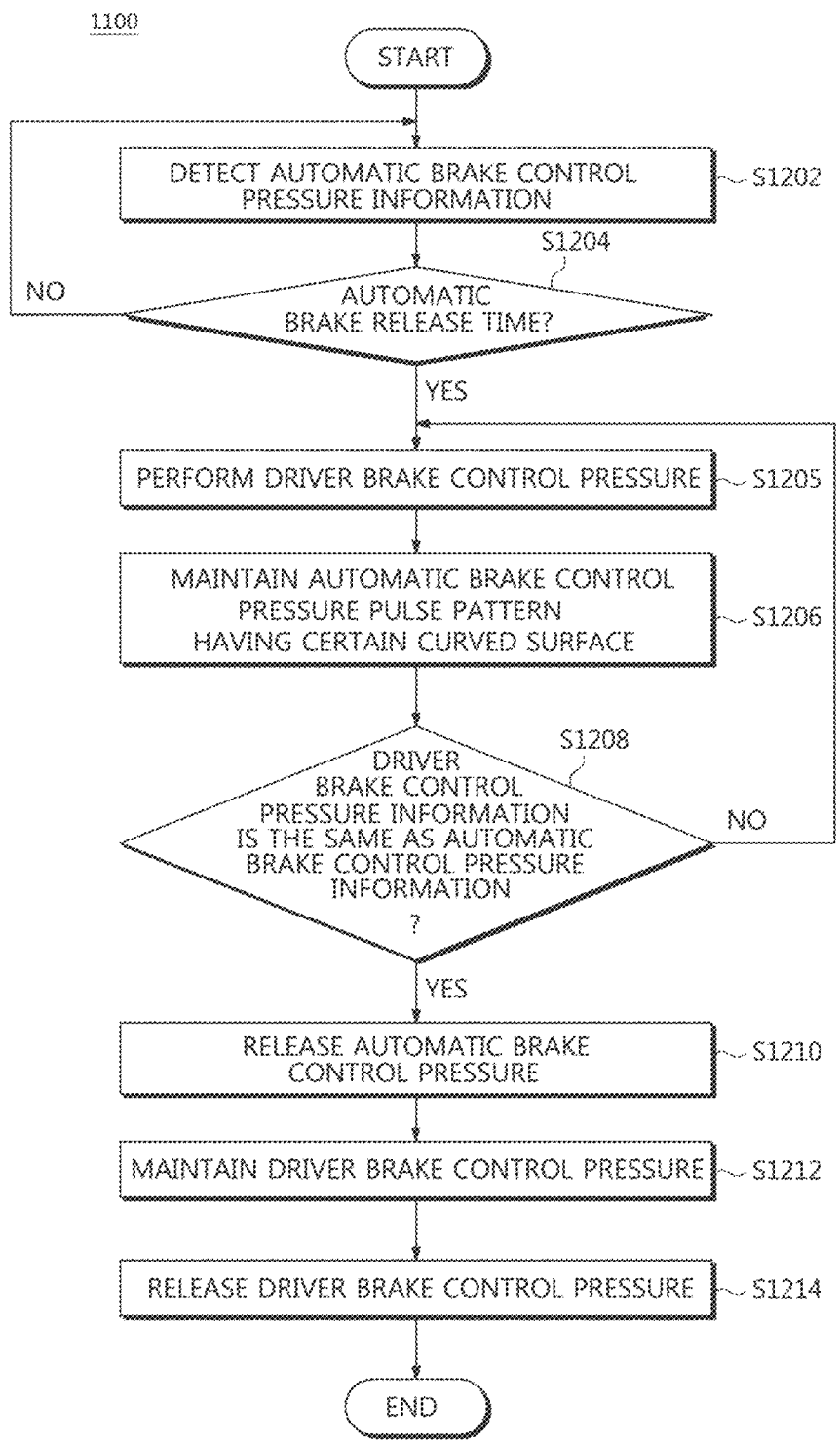
FIG. 13 is a control flowchart illustrating another example of a vehicle brake control method of a vehicle brake control apparatus in accordance with the first embodiment of the present disclosure.
Figure 14:
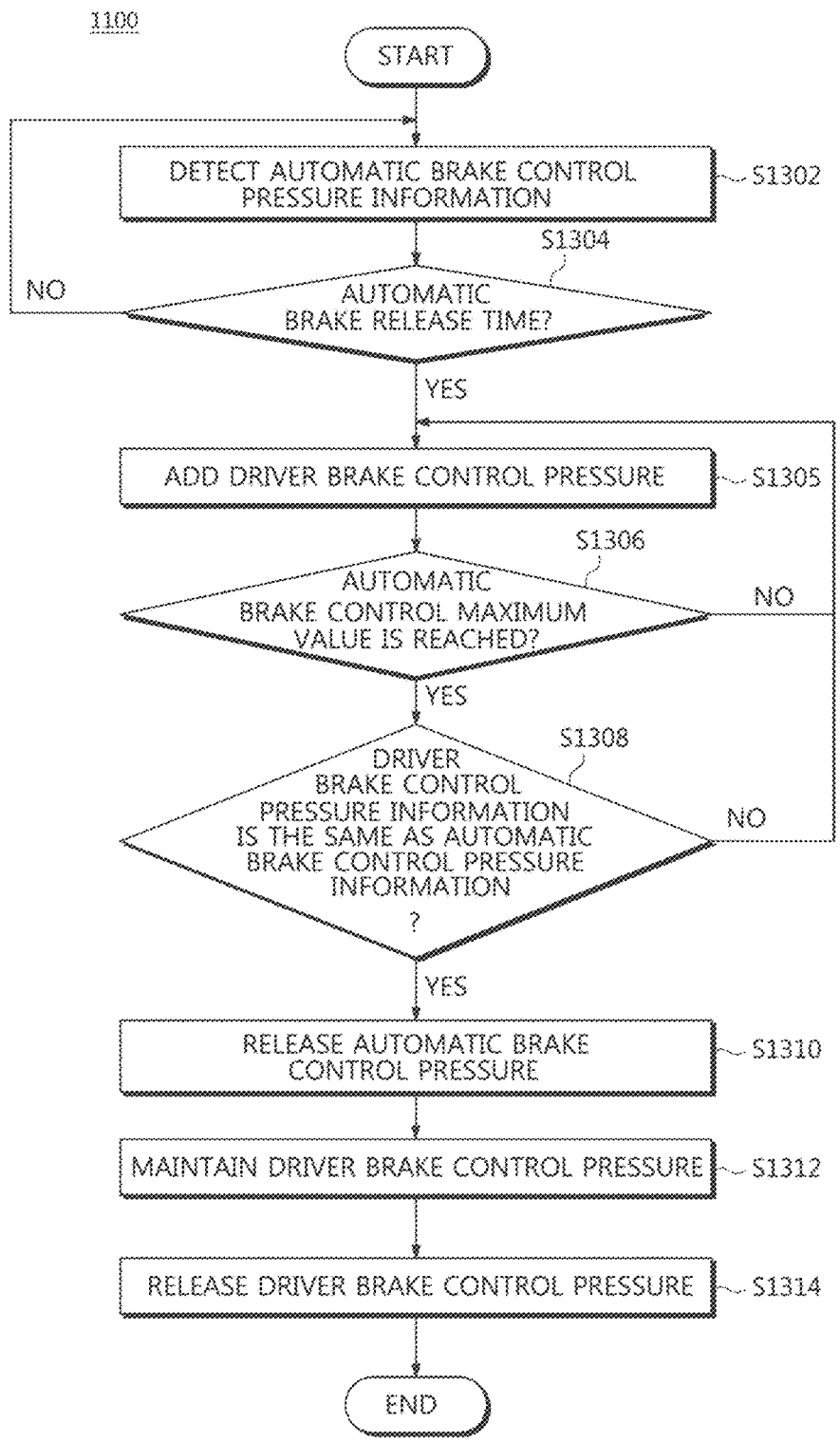
FIG. 14 is a control flowchart illustrating another example of a vehicle brake control method of a vehicle brake control apparatus in accordance with the first embodiment of the present disclosure.

FIG. 13 is a control flowchart illustrating another example of a vehicle brake control method of a vehicle brake control apparatus in accordance with the first embodiment of the present disclosure and FIG. 14 is a control flowchart illustrating another example of a vehicle brake control method of a vehicle brake control apparatus in accordance with the first embodiment of the present disclosure.

Referring to FIGS. 9 to 14, a vehicle brake control method (800 to 1300) of the brake of the vehicle brake control apparatus 100 of FIG. 2 according to the first embodiment may include a detection operation (S802 to S1302), a first determination operation (S804 to S1304), a driver brake control pressure performance operation (S805 to S1305), a braking force maintenance operation (S806 to S1306), a second determination operation (S808 to S1308), an automatic brake control pressure release operation (S810 to S1310), a driver brake control pressure maintenance operation (S812 to S1312), and a driver brake control pressure release operation (S814 to S1314).

In the detection operation (S802 to S1202), automatic brake control pressure information (P1 of FIGS. 4 to 7) may be detected by the detection unit 102 of FIG. 2 when the automatic braking is performed (P1-1 of FIGS. 4 to 7) as closing to a current object through the automatic brake control pressure information (P1 of FIGS. 4 to 7), and the automatic braking is released (P1-3, P1-4, P1-5, P1-6 of FIGS. 4 to 7) in the automatic brake apparatus 10.

In the first determination operation (S804 to S1204), whether it is a first state in which a present time of the automatic brake control pressure information (P1 of FIGS. 4 to 7) detected by the detector 102 of FIG. 2 is an automatic brake release time period (t1 of FIGS. 4 to 7) may be determined in the determination unit 104 of FIG. 2 according to the control of the controller 108 of FIG. 2.

In the driver brake control pressure performance operation (S805 to S1205), when it is determined to be the first state in which a present time of the automatic brake control pressure information (P1 of FIGS. 4 to 7) is an automatic brake release time period (t1 of FIGS. 4 to 7) in the determination unit 104 of FIG. 2, the driver brake control pressure information (P2) may be generated from the automatic brake release time period (t1) and the driver brake control (P2-1) may be performed during the automatic brake release time period (t1 to t4).

In the braking force maintenance operation (S806), when it is determined to be the first state in which the present time of the automatic brake control pressure information (P1 of FIGS. 4 to 7) is an automatic brake release time (t1 of FIGS. 4 to 7) in the determination unit 104 of FIG. 2, an automatic brake release time period (t1 to t3 of FIGS. 4 to 7) of the automatic brake control pressure information (P1 of FIGS. 4 to 7) may be maintained by the braking force maintenance unit 106 of FIG. 2 according to the control of the controller 108 of FIG. 2 until the driver brake control pressure information (P2 of FIGS. 4 to 7) of the brake pedal 30 of FIG. 2, which is stepped by the driver, becomes the same state (A of FIGS. 2 to 7) as the automatic brake control pressure information (P1 of FIGS. 4 to 7).

For an example, as illustrated in FIG. 10, In the braking force maintenance operation (S906), the automatic brake control pressure information (P1 of FIGS. 4 to 7) may be maintained as a certain automatic brake control pressure pulse pattern (S1-1 of FIG. 4) by the braking force maintenance unit 106 of FIG. 2 during the automatic brake release time period (t1 to t3 of FIGS. 4 to 7) of the automatic brake control pressure information (P1 of FIGS. 4 to 7) according to the control of the controller 108 of FIG. 2 until the driver brake control pressure information (P2 of FIGS. 4 to 7) of the brake pedal 30 of FIG. 2, which is stepped by the driver, becomes the same state (A of FIGS. 4 to 7) as the automatic brake control pressure information (P1 of FIGS. 4 to 7).

For another example, as illustrated in FIG. 11, In the braking force maintenance operation (S1006), the automatic brake control pressure information (P1 of FIGS. 4 to 7) may be maintained as an automatic brake control pressure pulse pattern (S2-1 of FIG. 5) having a certain angle by the braking force maintenance unit 106 of FIG. 2 during the automatic brake release time period (t1 to t3 of FIGS. 4 to 7) of the automatic brake control pressure information (P1 of FIGS. 4 to 7) according to the control of the controller 108 of FIG. 2 until the driver brake control pressure information (P2 of FIGS. 4 to 7) of the brake pedal 30 of FIG. 2, which is stepped by the driver, becomes the same state (A of FIGS. 4 to 7) as the automatic brake control pressure information (P1 of FIGS. 4 to 7).

For another example, as illustrated in FIG. 12, In the braking force maintenance operation (S1106), the automatic brake control pressure information (P1 of FIGS. 4 to 7) may be maintained as an automatic brake control pressure pulse pattern (S3-1 of FIG. 6) having a certain bent surface by the braking force maintenance unit 106 of FIG. 2 during the automatic brake release time period (t1 to t3 of FIGS. 4 to 7) of the automatic brake control pressure information (P1 of FIGS. 4 to 7) according to the control of the controller 108 of FIG. 2 until the driver brake control pressure information (P2 of FIGS. 4 to 7) of the brake pedal 30 of FIG. 2, which is stepped by the driver, becomes the same state (A of FIGS. 4 to 7) as the automatic brake control pressure information (P1 of FIGS. 4 to 7).

For another example, as illustrated in FIG. 13, In the braking force maintenance operation (S1206), the automatic brake control pressure information (P1 of FIGS. 4 to 7) may be maintained as an automatic brake control pressure pulse pattern (S4-1 of FIG. 7) having a certain curved surface by the braking force maintenance unit 106 of FIG. 2 during the automatic brake release time period (t1 to t3 of FIGS. 4 to 7) of the automatic brake control pressure information (P1 of FIGS. 4 to 7) according to the control of the controller 108 of FIG. 2 until the driver brake control pressure information (P2 of FIGS. 4 to 7) of the brake pedal 30 of FIG. 2, which is stepped by the driver, becomes the same state (A of FIGS. 4 to 7) as the automatic brake control pressure information (P1 of FIGS. 4 to 7).

In the second determination operation (S808 to S1208), whether the driver brake control pressure information (P2 of FIGS. 4 to 7) of the brake pedal 30 of FIG. 2, which is stepped by the driver, is the same state (A of FIGS. 4 to 7) as the automatic brake control pressure information (P1 of FIGS. 4 to 7) may be determined by the determination unit 104 of FIG. 2 according to the control of the controller 108 of FIG. 2.

In the automatic brake control pressure release operation (S810 to S1210), when it is determined to be the first state in which the present time of the automatic brake control pressure information (P1 of FIGS. 4 to 7) is an automatic brake release time (t1 of FIGS. 4 to 7) by the determination unit 104 of FIG. 2, the automatic brake control pressure of the automatic brake control pressure information (P1 of FIGS. 4 to 7) may be released (P1-3, P1-4, P1-5, P1-6 of FIGS. 4 to 7) by the controller 108 of FIG. 2.

In the driver brake control pressure maintenance operation (S812 to S1212), the driver brake control pressure information (P2 of FIGS. 4 to 7) may maintain the driver brake control (P2-2 of FIGS. 4 to 7) during the driver brake control maintenance time period (t4, t5 of FIGS. 4 to 7).

In the driver brake control pressure release operation (S814 to S1214), the driver brake control pressure information (P2 of FIGS. 4 to 7) may release the driver brake control (P2-3 of FIGS. 4 to 7) during the driver brake control release time period (t5, t6 of FIGS. 4 to 7).

As mentioned above, according to the first embodiment, the vehicle brake control method (800 to 1200) of the brake of the vehicle brake control apparatus 100 may perform the detection operation (S802 to S1202), the first determination operation (S804 to S1204), the driver brake control pressure performance operation (S805 to S1205), the braking force maintenance operation (S806 to S1206), the second determination operation (S808 to S1208), the automatic brake control pressure release operation (S810 to S1210), the driver brake control pressure maintenance operation (S812 to S1212), and the driver brake control pressure release operation (S814 to S1214) by including the detector 102, the determination unit 104, the braking force maintenance unit 106, and the controller 108.

Therefore, according to the first embodiment, in the vehicle brake control method (800 to 1200) of the brake of the vehicle brake control apparatus 100, when the present time of the automatic brake control pressure information (P1) is the automation brake release time (t1), the automatic brake release time (t1 to t3) of the automatic brake control pressure information (P1) may be maintained until the driver brake control pressure information (P2) of the brake pedal 30, which is stepped by the driver, becomes the same state (A) as the automatic brake control pressure information (P1).

FIG. 14 is a control flowchart illustrating another example of a vehicle brake control method of a vehicle brake control apparatus in accordance with the first embodiment of the present disclosure.

In a detection operation (S1302), automatic brake control pressure information (P1 of FIG. 8) may be detected by the detection unit 102 of FIG. 102 when the automatic braking is performed as closing to a current object by using the automatic brake control pressure information (P1 of FIG. 8) and the automatic braking is released (P1-7 of FIG. 8) in the automatic brake apparatus 10.

In a first determination operation (S1304), whether it is a first state in which a present time of the automatic brake control pressure information (P1 of FIG. 8) detected by the detector 102 of FIG. 2 is the automatic brake release time period (t1 of FIG. 8) may be determined by the determination unit 104 of FIG. 2 according to the control of the controller 108 of FIG. 2.

In a driver brake control pressure performance operation (S1305), when it is determined to be the first state in which the present time of the automatic brake control pressure information (P1 of FIG. 8) is the automatic brake release time period (t1 of FIG. 8) by the determination unit 104 of FIG. 2, the driver brake control pressure information (P2) may be generated from the automatic brake release time (t1) and the driver brake control (P2-1) may be performed during the automatic brake release time period (t1 to t4).

Particularly, when it is the first state in which the present time of automatic brake control pressure information (P1) is the automatic brake release time period (t1), the braking force maintenance unit 106 may maintain a state in which a braking force is continuously increased, by adding the driver brake control pressure information (P2) of the brake pedal 30, which is stepped by the driver, to the automatic brake control pressure information (P1) (S1305).

At this time, the driver brake control pressure information (P2) may be generated from the automatic brake release time period (t1), and the automatic brake control may be performed (P2-1) during the automatic brake control release time period (t1 to t4).

As illustrated in FIG. 8, when the braking force maintenance unit 106 maintains the state in which the braking force is continuously increased, the determination unit 104 may determine whether an automatic control maximum value is reached (S1306).

In a second determination operation (S1308), whether the driver brake control pressure information (P2 of FIG. 8) of the pedal 30 of FIG. 2, which is stepped by the driver, is the automatic control maximum value as the same as the automatic brake control pressure information (P1 of FIG. 8), may be determined by the determination unit 104 of FIG. 2 according to the control of the controller 108 of FIG. 2.

When the determination unit 104 of FIG. 2 determines that the driver brake control pressure information (P2 of FIG. 8) of the pedal 30 of FIG. 2, which is stepped by the driver, is the automatic control maximum value as the same as the automatic brake control pressure information (P1 of FIG. 8), according to the control of the controller 108 of FIG. 2, the automatic brake control pressure of the automatic brake control pressure information (P1 of FIG. 8) may be released (P1-7 of FIG. 8) by the controller 108 of FIG. 2.

Accordingly, according to the first embodiment, through the vehicle brake control method (800 to 1300) of the brake of the vehicle brake control apparatus 100, the braking force may be maintained until the driver brake control pressure information (P2) of the brake pedal 30, which is stepped by the driver, becomes the same state (A) as the automatic brake control pressure information (P1), thereby reducing the braking force loss, providing the stable braking sense to a driver, and preventing a risk of collision in advance.

Figure 15:
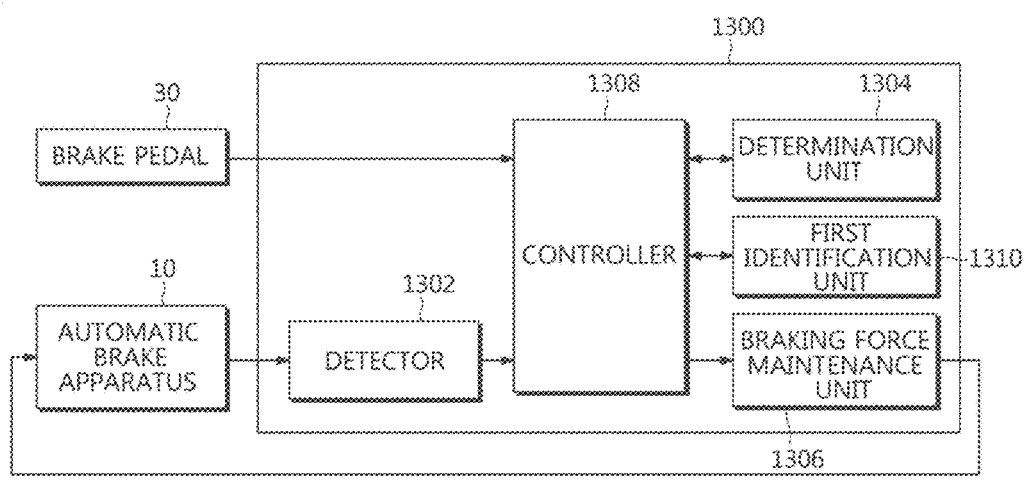
FIG. 15 is a block diagram illustrating an example of a vehicle brake control apparatus in accordance with a second embodiment of the present disclosure.

FIG. 15 is a block diagram illustrating an example of a vehicle brake control apparatus in accordance with a second embodiment of the present disclosure.

Referring to FIG. 15, according to the second embodiment, a vehicle brake control apparatus 1300 may include a detector 1302, a determination unit 1304, a braking force maintenance unit 1306, and a controller 1308, like as the vehicle brake control apparatus 100 of FIG. 2 according to the first embodiment.

A function of the detector 1302, the determination unit 1304, the braking force maintenance unit 1306 and the controller 1308 of the vehicle brake control apparatus 1300 according to the second embodiment, and an organic relation therebetween may be the same as the function of the detector 102 of FIG. 2, the determination unit 104 of FIG. 2, the braking force maintenance unit 106 of FIG. 2 and the controller 108 of FIG. 2 of the vehicle brake control apparatus 100 of FIG. 2 according to the first embodiment and the organic relation therebetween, and thus each description thereof will be omitted.

According to the second embodiment, the vehicle brake control apparatus 1300 may further include a first identification unit 1310.

That is, the first identification unit 1310 may identify whether the automatic brake control pressure information (P1 of FIGS. 4 to 7) is maintained during the automatic brake release time period (t1 to t3 of FIGS. 4 to 7) of the automatic brake control pressure information (P1 of FIGS. 4 to 7) until the driver brake control pressure information (P2 of FIGS. 4 to 7) of the brake pedal 30, which is stepped by the driver, becomes the same state (A of FIGS. 4 to 7) as the automatic brake control pressure information (P1 of FIGS. 4 to 7).

Although not shown, the first identification unit 1310 may include at least one of an alarm (not shown), a speaker (not shown), and an emitting member (not shown), all of which is provided to allow a driver to recognize information and conditions of the vehicle, and thus the first identification unit 1310 may allow the driver to identify whether the automation brake release time (t1 to t3 of FIGS. 4 to 7) of the automatic brake control pressure information (P1 of FIGS. 4 to 7) is maintained, through at least one of an alarm operation of the alarm (not shown), a voice operation of speaker (not shown), and an emitting operation of the emitting member (not shown).

Although not shown, the first identification unit 1310 may include at least one of Human Machine Interface (HMI) module (not shown) and Head-UP Display (HUD) module (not shown) both of which are provided to allow a driver to recognize information and conditions of the vehicle by interfacing a user with a machine, and thus the first identification unit 1310 may allow the driver to identify whether the automation brake release time (t1 to t3 of FIGS. 4 to 7) of the automatic brake control pressure information (P1 of FIGS. 4 to 7) is maintained, through at least one of a message display operation of Human Machine Interface (HMI) module (not shown) and Head-UP Display (HUD) module (not shown).

A vehicle brake control method for control a vehicle by using the vehicle brake control apparatus 1300 according to the second embodiment will be described in the following with reference to FIG. 16.

Figure 16:
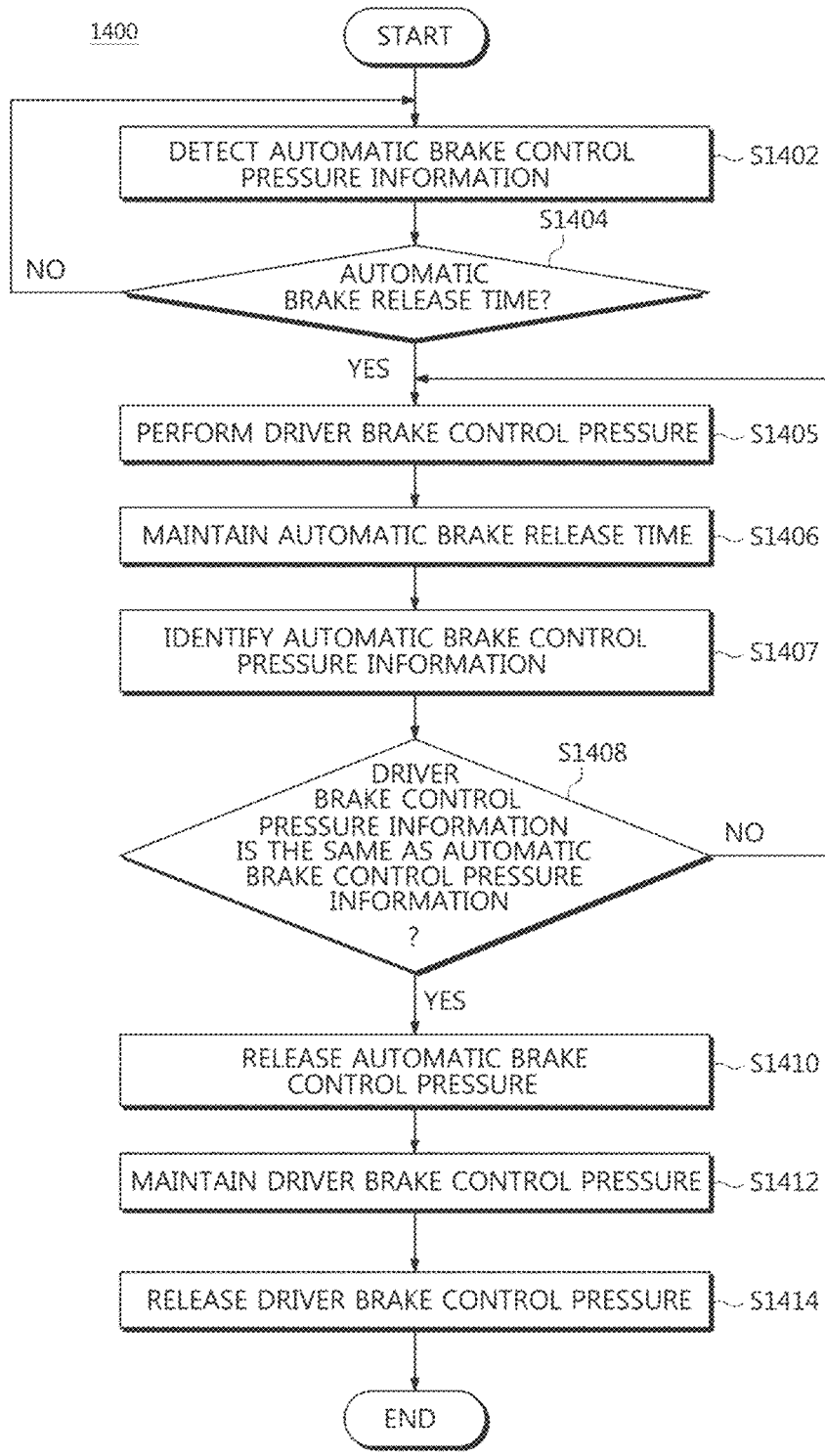
FIG. 16 is a control flowchart illustrating a vehicle brake control method of a vehicle brake control apparatus in accordance with the second embodiment of the present disclosure.

FIG. 16 is a control flowchart illustrating a vehicle brake control method of a vehicle brake control apparatus in accordance with the second embodiment of the present disclosure.

Referring to FIG. 16, according to the second embodiment, a vehicle brake control method (1400) of the brake of the vehicle brake control apparatus 1300 may include a detection operation (S1402), a first determination operation (S1404), a driver brake control pressure performance operation (S1405), a braking force maintenance operation (S1406), a second determination operation (S1408), an automatic brake control pressure release operation (S1410), a driver brake control pressure maintenance operation (S1412), and a driver brake control pressure release operation (S1414) like as the vehicle brake control method 800 of FIG. 8 of the vehicle brake control apparatus 100 of FIG. 2 according to the first embodiment.

Among the vehicle brake control method (1400) of the brake of the vehicle brake control apparatus 1300 according to the second embodiment, a function of the detection operation (S1402), the first determination operation (S1404), the driver brake control pressure performance operation (S1405), the braking force maintenance operation (S1406), the second determination operation (S1408), the automatic brake control pressure release operation (S1410), the driver brake control pressure maintenance operation (S1412), and the driver brake control pressure release operation (S1414), and an organic relation therebetween may be the same as, among the vehicle brake control method (800) of the brake of the vehicle brake control apparatus 100 according to the first embodiment, the function of the detection operation (S802 of FIG. 8), the first determination operation (S804 of FIG. 8), the driver brake control pressure performance operation (S805 of FIG. 8), the braking force maintenance operation (S806 of FIG. 8), the second determination operation (S808 of FIG. 8), the automatic brake control pressure release operation (S8010 of FIG. 8), the driver brake control pressure maintenance operation (S812 of FIG. 8), and the driver brake control pressure release operation (S814 of FIG. 8), and an organic relation therebetween, and thus each description thereof will be omitted.

The vehicle brake control method (1400) of the brake of the vehicle brake control apparatus 1300 according to the second embodiment may further include a first identification operation (S 1407).

For an example, the first identification operation (S 1407) may be performed after the braking force maintenance operation (S1406) and before the second determination operation (S1408).

That is, in the first identification operation (S 1407), whether the automatic brake control pressure information (P1 of FIGS. 4 to 7) is maintained during the automatic brake release time period (t1 to t3 of FIGS. 4 to 7) of the automatic brake control pressure information (P1 of FIGS. 4 to 7) until the driver brake control pressure information (P2 of FIGS. 4 to 7) of the brake pedal 30, which is stepped by the driver, becomes the same state (A of FIGS. 4 to 7) as the automatic brake control pressure information (P1 of FIGS. 4 to 7), may be identified by the first identification unit 1310 of FIG. 13 according to the control of the controller 1308 of FIG. 13.

As mentioned above, according to the second embodiment, the vehicle brake control method (1400) of the brake of the vehicle brake control apparatus 1300 may perform the detection operation (S1402), the first determination operation (S1404), the driver brake control pressure performance operation (S1405), the braking force maintenance operation (S1406), the second determination operation (S1408), the automatic brake control pressure release operation (S1410), the driver brake control pressure maintenance operation (S1412), and the driver brake control pressure release operation (S1414), by including the detector 1302, the determination unit 1304, the braking force maintenance unit 1306, the controller 1308, and the first identification unit 1310.

Therefore, according to the second embodiment, in the vehicle brake control method (1400) of the brake of the vehicle brake control apparatus 1300, when a present time of the automatic brake control pressure information (P1) is the automation brake release time (t1), the automatic brake release time (t1 to t3) of the automatic brake control pressure information (P1) may be maintained until the driver brake control pressure information (P2) of the brake pedal 30, which is stepped by the driver, becomes the same state (A) as the automatic brake control pressure information (P1).

Accordingly, according to the second embodiment, in the vehicle brake control method (1400) of the brake of the vehicle brake control apparatus 1300, the braking force may be maintained until the driver brake control pressure information (P2) of the brake pedal 30, which is stepped by the driver, becomes the same state (A) as the automatic brake control pressure information (P1), thereby reducing the braking force loss, providing the stable braking sense to a driver, and preventing a risk of collision in advance.

In addition, according to the second embodiment, in the vehicle brake control method (1400) of the brake of the vehicle brake control apparatus 1300, whether the automatic brake control pressure information (P1) is maintained during the automatic brake release time period (t1 to t3) of the automatic brake control pressure information (P1) until the driver brake control pressure information (P2) of the brake pedal 30, which is stepped by the driver, becomes the same state (A) as the automatic brake control pressure information (P1) may be identified.

Accordingly, according to the second embodiment, through the vehicle brake control method (1400) of the brake of the vehicle brake control apparatus 1300, a driver may recognize that the automatic brake control pressure information (P1) is maintained during the automatic brake release time period (t1 to t3) of the automatic brake control pressure information (P1) and thus the driver may be led to drive carefully.

Figure 17:
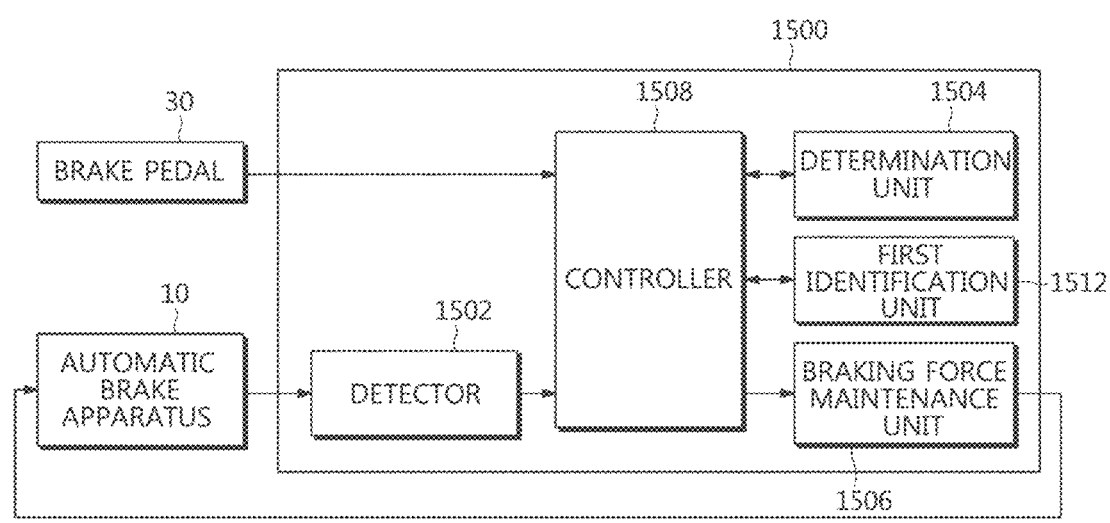
FIG. 17 is a block diagram illustrating an example of a vehicle brake control apparatus in accordance with a third embodiment of the present disclosure.

FIG. 17 is a block diagram illustrating an example of a vehicle brake control apparatus in accordance with a third embodiment of the present disclosure.

Referring to FIG. 17, according to the third embodiment, a vehicle brake control apparatus 1500 may include a detector 1502, a determination unit 1504, a braking force maintenance unit 1506, and a controller 1508, as the same as the vehicle brake control apparatus 100 of FIG. 2 according to the first embodiment.

A function of the detector 1502, the determination unit 1504, the braking force maintenance unit 1506 and the controller 1508 of the vehicle brake control apparatus 1500 according to the third embodiment, and an organic relation therebetween may be the same as the function of the detector 102 of FIG. 2, the determination unit 104 of FIG. 2, the braking force maintenance unit 106 of FIG. 2 and the controller 108 of FIG. 2 of the vehicle brake control apparatus 100 of FIG. 2 according to the first embodiment, and the organic relation therebetween, and thus each description thereof will be omitted.

According to the third embodiment, the vehicle brake control apparatus 1500 may further include a second identification unit 1512.

That is, when the determination unit 1504 determines that the driver brake control pressure information (P2 of FIGS. 4 to 7) of the brake pedal 30, which is stepped by the driver, is the same state (A of FIGS. 4 to 7) as the automatic brake control pressure information (P1 of FIGS. 4 to 7), the second identification unit 1512 may identify whether the automatic brake control pressure of the automatic brake control pressure information (P1 of FIGS. 4 to 7) is released (P1-3, P1-4, P1-5, P1-6 of FIGS. 4 to 7).

Although not shown, the second identification unit 1512 may include at least one of an alarm (not shown), a speaker (not shown), and an emitting member (not shown), all of which is provided to allow a driver to recognize information and conditions of the vehicle, and thus the second identification unit 1512 may allow the driver to identify whether the automatic brake control pressure of the automatic brake control pressure information (P1 of FIGS. 4 to 7) is released (P1-3, P1-4, P1-5, P1-6 of FIGS. 4 to 7), through at least one of an alarm operation of the alarm (not shown), a voice operation of speaker (not shown), and an emitting operation of the emitting member (not shown).

Although not shown, the second identification unit 1512 may include at least one of Human Machine Interface (HMI) module (not shown) and Head-UP Display (HUD) module (not shown) both of which are provided to allow a driver to recognize information and conditions of the vehicle by interfacing a user with a machine, and thus the second identification unit 1512 may allow the driver to identify whether the automatic brake control pressure of the automatic brake control pressure information (P1 of FIGS. 4 to 7) is released (P1-3, P1-4, P1-5, P1-6 of FIGS. 4 to 7), through at least one of a message display operation of Human Machine Interface (HMI) module (not shown) and Head-UP Display (HUD) module (not shown).

A vehicle brake control method for control a vehicle by using the vehicle brake control apparatus 1500 according to the third embodiment will be described in the following with reference to FIG. 18.

Figure 18:
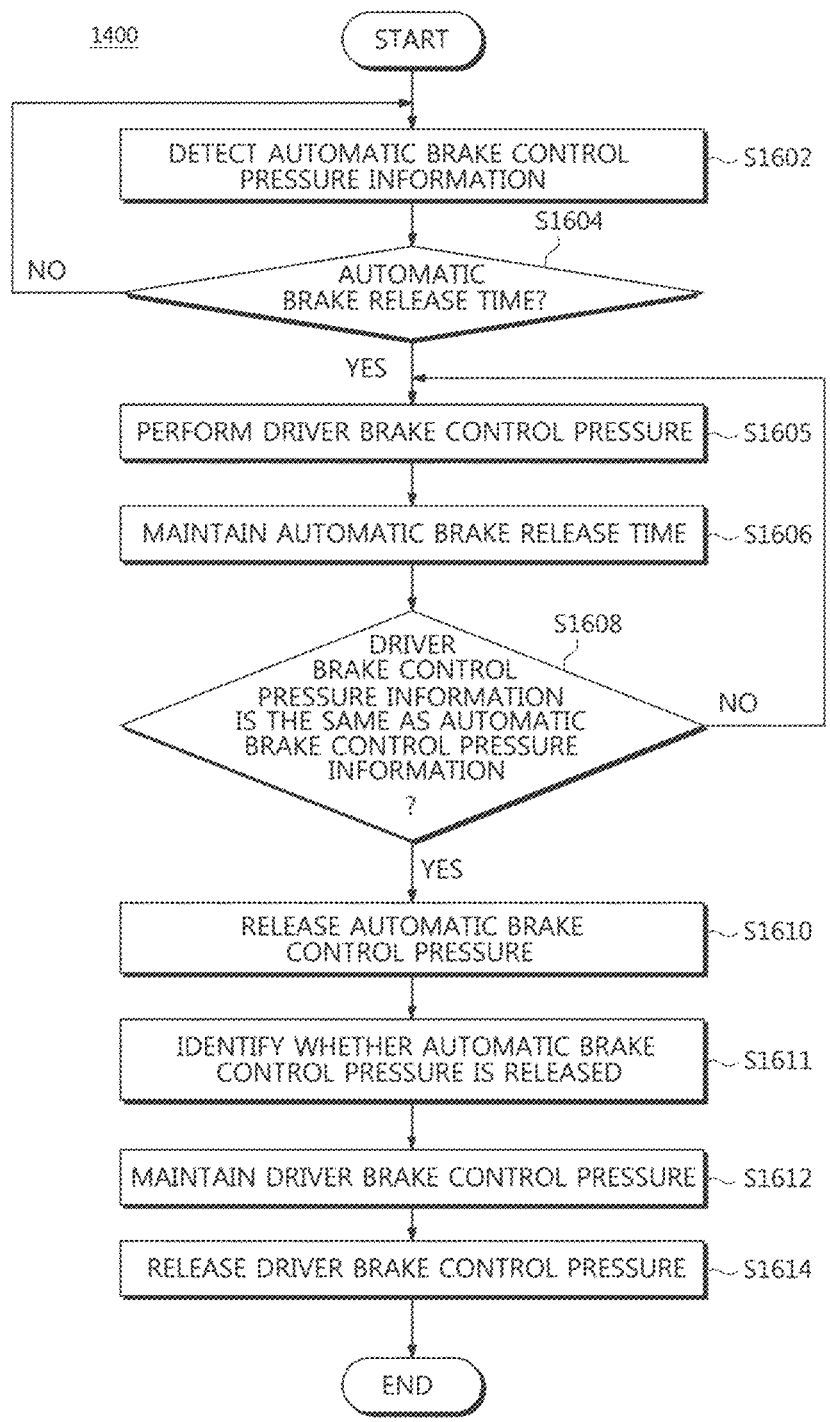
FIG. 18 is a control flowchart illustrating a vehicle brake control method of a vehicle brake control apparatus in accordance with the third embodiment of the present disclosure.

FIG. 18 is a control flowchart illustrating a vehicle brake control method of a vehicle brake control apparatus in accordance with the third embodiment of the present disclosure.

Referring to FIG. 18, according to the third embodiment, a vehicle brake control method (1600) of the brake of the vehicle brake control apparatus 1500 may include a detection operation (S1602), a first determination operation (S1604), a driver brake control pressure performance operation (S1605), a braking force maintenance operation (S1606), a second determination operation (S1608), an automatic brake control pressure release operation (S1610), a driver brake control pressure maintenance operation (S1612), and a driver brake control pressure release operation (S1614) like as the vehicle brake control method 800 of FIG. 8 of the vehicle brake control apparatus 100 of FIG. 2 according to the first embodiment.

Among the vehicle brake control method (1600) of the brake of the vehicle brake control apparatus 1500 according to the second embodiment, a function of the detection operation (S1602), the first determination operation (S1604), the driver brake control pressure performance operation (S1605), the braking force maintenance operation (S1606), the second determination operation (S1608), the automatic brake control pressure release operation (S1610), the driver brake control pressure maintenance operation (S1612), and the driver brake control pressure release operation (S1614), and an organic relation there between may be the same as, among the vehicle brake control method (800) of the brake of the vehicle brake control apparatus 100 according to the first embodiment, the function of the detection operation (S802 of FIG. 8), the first determination operation (S804 of FIG. 8), the driver brake control pressure performance operation (S805 of FIG. 8), the braking force maintenance operation (S806 of FIG. 8), the second determination operation (S808 of FIG. 8), the automatic brake control pressure release operation (S8010 of FIG. 8), the driver brake control pressure maintenance operation (S812 of FIG. 8), and the driver brake control pressure release operation (S814 of FIG. 8), and an organic relation therebetween, and thus each description thereof will be omitted.

The vehicle brake control method (1600) of the brake of the vehicle brake control apparatus 1600 according to the third embodiment may further include a second identification operation (S 1611).

For an example, the second identification operation (S 1611) may be performed after the automatic brake control pressure release operation (S1610), and before the driver brake control pressure maintenance operation (S1612).

That is, in the second identification operation (S 1611), when the determination unit 1504 of FIG. 15 determines that the driver brake control pressure information (P2 of FIGS. 4 to 7) of the brake pedal 30, which is stepped by the driver, is the same state (A of FIGS. 4 to 7) as the automatic brake control pressure information (P1 of FIGS. 4 to 7), whether the automatic brake pressure of the automatic brake control pressure information (P1 of FIGS. 4 to 7) is released (P1-3, P1-4, P1-5, P1-6 of FIGS. 4 to 7) may be identified by the second identification unit 1512 of FIG. 15 according to the control of the controller 1508 of FIG. 15.

As mentioned above, according to the third embodiment, the vehicle brake control method (1600) of the brake of the vehicle brake control apparatus 1500 may perform the detection operation (S1602), the first determination operation (S1604), the driver brake control pressure performance operation (S1605), the braking force maintenance operation (S1606), the second determination operation (S1608), the automatic brake control pressure release operation (S1610), the driver brake control pressure maintenance operation (S1612), and the driver brake control pressure release operation (S1614), by including the detector 1502, the determination unit 1504, the braking force maintenance unit 1506, the controller 1508, and the second identification unit 1512.

Therefore, according to the third embodiment, in the vehicle brake control method (1600) of the brake of the vehicle brake control apparatus 1500, when a present time of the automatic brake control pressure information (P1) is the automation brake release time (t1), the automatic brake release time (t1 to t3) of the automatic brake control pressure information (P1) may be maintained until the driver brake control pressure information (P2) of the brake pedal 30, which is stepped by the driver, becomes the same state (A) as the automatic brake control pressure information (P1).

Accordingly, according to the third embodiment, through the vehicle brake control method (1600) of the brake of the vehicle brake control apparatus 1500, the braking force may be maintained until the driver brake control pressure information (P2) of the brake pedal 30, which is stepped by the driver, becomes the same state (A) as the automatic brake control pressure information (P1), thereby reducing the braking force loss, providing the stable braking sense to a driver, and preventing a risk of collision in advance.

In addition, according to the third embodiment, in the vehicle brake control method (1600) of the brake of the vehicle brake control apparatus 1500, when the driver brake control pressure information (P2 of FIGS. 4 to 7) of the brake pedal 30, which is stepped by the driver, is the same state (A of FIGS. 4 to 7) as the automatic brake control pressure information (P1 of FIGS. 4 to 7), whether the automatic brake pressure of the automatic brake control pressure information (P1 of FIGS. 4 to 7) is released (P1-3, P1-4, P1-5, P1-6 of FIGS. 4 to 7) may be identified.

Accordingly, according to the third embodiment, the vehicle brake control method (1600) of the brake of the vehicle brake control apparatus 1500, a driver may recognize that the automatic brake pressure of the automatic brake control pressure information (P1 of FIGS. 4 to 7) is released (P1-3, P1-4, P1-5, P1-6 of FIGS. 4 to 7) is identified and thus the driver may be led to drive carefully.

As is apparent from the above description, according to the proposed vehicle brake control apparatus and the control thereof, the loss of the braking force may be reduced, the stable braking sense may be provided to a driver, and the risk of collision may be prevented in advance.

In addition, according to the vehicle brake control apparatus and the control thereof, the driver may be led to drive carefully.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle brake control apparatus comprising:
    a detector configured to detect automatic brake control pressure information, when an automatic brake apparatus performs an automatic braking by using the automatic brake control pressure information as closing to a current object and releases the automatic braking;
    a processor configured to:
        determine whether it is a first state in which a present time of detected automatic brake control pressure information is an automatic brake release time; and
        maintain the automatic brake release time of the automatic brake control pressure information, when it is the first state, until driver brake control pressure information of a pedal, which is stepped by a driver, becomes the same state as the automatic brake control information; and
    a controller configured to deliver a command of maintaining braking force to the processor so as to receive the automatic brake control pressure information and the driver brake control pressure information, and so as to maintain the automatic brake release time of the automatic brake control pressure information until the driver brake control pressure information becomes the same state as the automatic brake control pressure information; and
    an alarming device configured to present to the driver, whether the automatic brake control pressure information is maintained during the automatic brake release time period until the driver brake control pressure information becomes the same state as the automatic brake control pressure information.

2. The vehicle brake control apparatus of claim 1 wherein the processor further determines whether the driver brake control pressure information is the same state as the automatic brake control pressure information, and the controller further releases the automatic brake control pressure of the automatic brake control pressure information when the processor determines that the driver brake control pressure information is the same state as the automatic brake control pressure information.

3. The vehicle brake control apparatus of claim 2, wherein the alarming device is further configured to present to the driver, whether the automatic brake control pressure of the automatic brake control pressure information is released, when the driver brake control pressure information is determined to be the same state as the automatic brake control pressure information.

4. The vehicle brake control apparatus of claim 1 wherein the processor maintains the automatic brake control pressure information as a certain automatic brake control pressure pulse pattern during the automatic brake release time period of the automatic brake control pressure information until the driver brake control pressure information becomes the same state as the automatic brake control pressure information.

5. The vehicle brake control apparatus of claim 1 wherein the processor maintains the automatic brake control pressure information as an automatic brake control pressure pulse pattern having a certain angle during the automatic brake release time period of the automatic brake control pressure information until the driver brake control pressure information becomes the same state as the automatic brake control pressure information.

6. The vehicle brake control apparatus of claim 1 wherein the processor maintains the automatic brake control pressure information as an automatic brake control pressure pulse pattern having a certain bent surface during the automatic brake release time period of the automatic brake control pressure information until the driver brake control pressure information becomes the same state as the automatic brake control pressure information.

7. The vehicle brake control apparatus of claim 1 wherein the processor maintains the automatic brake control pressure information as an automatic brake control pressure pulse pattern having a certain curved surface during the automatic brake release time period of the automatic brake control pressure information until the driver brake control pressure information becomes the same state as the automatic brake control pressure information.

8. The vehicle brake control apparatus of claim 1 wherein the current object comprises at least one of an outside wall, another vehicle and a motorcycle, and animal and obstacle.

9. A vehicle brake control apparatus comprising:
    a detector configured to detect automatic brake control pressure information, when an automatic brake apparatus performs an automatic braking by using the automatic brake control pressure information as closing to a current object and releases the automatic braking;
    a processor configured to:
        determine whether it is a first state in which a present time of detected automatic brake control pressure information is an automatic brake release time;
        maintain the automatic brake release time of the automatic brake control pressure information, when it is the first state, until a pre-set automatic brake control maximum value is reached by adding driver brake control pressure of a pedal, which is stepped by a driver, to the automatic brake control pressure; and
    a controller configured to deliver a command of maintaining braking force to the processor so as to receive the automatic brake control pressure information and the driver brake control pressure information and so as to maintain the automatic brake release time of the automatic brake control pressure information until the driver brake control pressure reaches the automatic brake control maximum value.

10. A brake control method of a vehicle brake control apparatus comprising:
    a detection operation of detecting automatic brake control pressure information when an automatic brake apparatus performs an automatic braking by using the automatic brake control pressure information as closing to a current object, and releases the automatic braking;

a first determination operation of determining whether it is a first state in which a present time of detected automatic brake control pressure information is an automatic brake release time;

a braking force maintenance operation of maintaining the automatic brake release time of the automatic brake control pressure information, when it is the first state, until driver brake control pressure information of a pedal, which is stepped by a driver, becomes the same state as the automatic brake control information; and an alarming operation of presenting to the driver, whether the automatic brake control pressure information is maintained during the automatic brake release time period until the driver brake control pressure information becomes the same state as the automatic brake control pressure information.

11. The brake control method of claim 10 further comprising:

a second determination operation of determining whether the driver brake control pressure information is the same state as the automatic brake control pressure information; and an automatic brake control pressure release operation of more releasing the automatic brake control pressure of the automatic brake control pressure information when the driver brake control pressure information is the same state as the automatic brake control pressure information.

12. The brake control method of claim 10 wherein
the braking force maintenance operation maintains the automatic brake control pressure information as a certain automatic brake control pressure pulse pattern during the automatic brake release time period of the automatic brake control pressure information until the driver brake control pressure information becomes the same state as the automatic brake control pressure information.

13. The brake control method of claim 10 wherein
the braking force maintenance operation maintains the automatic brake control pressure information as an automatic brake control pressure pulse pattern having a certain angle during the automatic brake release time period of the automatic brake control pressure information until the driver brake control pressure information becomes the same state as the automatic brake control pressure information.

14. The brake control method of claim 10 wherein
the braking force maintenance operation maintains the automatic brake control pressure information as an automatic brake control pressure pulse pattern having a certain bent surface during the automatic brake release time period of the automatic brake control pressure information until the driver brake control pressure information becomes the same state as the automatic brake control pressure information.

15. The brake control method of claim 10 wherein
the braking force maintenance operation maintains the automatic brake control pressure information as an automatic brake control pressure pulse pattern having a certain curved surface during the automatic brake release time period of the automatic brake control pressure information until the driver brake control pressure information becomes the same state as the automatic brake control pressure information.

16. The brake control method of claim 10,
wherein the alarming operation further includes:
presenting to the driver, whether the automatic brake control pressure of the automatic brake control pressure information is released when the driver brake control pressure information becomes the same state as the automatic brake control pressure information.

17. A brake control method of a vehicle brake control apparatus comprising:

a detection operation of detecting automatic brake control pressure information when an automatic brake apparatus performs an automatic braking by using the automatic brake control pressure information as closing to a current object, and releases the automatic braking;

a first determination operation of determining whether it is a first state in which a present time of detected automatic brake control pressure information is an automatic brake release time; and a braking force maintenance operation of maintaining the automatic brake release time of the automatic brake control pressure information, when it is the first state, until a pre-set automatic brake control maximum value is reached by adding driver brake control pressure of a pedal, which is stepped by a driver, to the automatic brake control pressure.

18. The brake control method of claim 17 further comprising:

an operation of delivering a command of maintaining braking force to a processor so as to receive the automatic brake control pressure information and the driver brake control pressure information, and to maintain the automatic brake release time of the automatic brake control pressure information until the driver brake control pressure reaches the automatic brake control maximum value.

* * * * *